United States Patent Office 3,796,675
Patented Mar. 12, 1974

3,796,675
COMPOSITIONS AND METHOD FOR MAKING VINYL RESIN FOAM PRODUCTS
Nicolas Fischer, Paris, France, assignor to Rhone-Progil, Courbevoie, France
No Drawing. Continuation of abandoned application Ser. No. 707,313, Feb. 21, 1968. This application Jan. 26, 1971, Ser. No. 109,950
Claims priority, application France, Feb. 23, 1967, 96,241
Int. Cl. C08f 47/08
U.S. Cl. 260—2.5 P                                10 Claims

ABSTRACT OF THE DISCLOSURE

A composition and method for the preparation of foam products of vinyl resins in which the vinyl resin in particulate form has absorbed thereon a compound in the form of an alkali metal alkylsulphate or mixture thereof with an alkanolamine alkylsulphate or admixtures thereof with one of the compounds such as an alkylene oxide condensate of an alcohol or phenol and an alkanolamide wherein the vinyl resinous particles with the compounds absorbed thereon are formed into a plastisol which is foamed by physical beating or whipping and then heated in the form desired to produce the foam product.

---

This application is a continuation of Ser. No. 707,313, filed Feb. 21, 1968, now abandoned.

This invention relates to foamed products of polyvinyl resins and to compositions and methods for the preparation of same.

Foamed resinous products are produced by various techniques, depending somewhat upon the composition employed, as represented by dry mixtures or plastisols of the resin.

Dry mixtures or dry blends are plasticized resinous materials having the form and behavior of a powder. Plastisols are fluid mixtures of a dry powdered resin which is present as a discontinuous phase in a continuous phase of plasticizer in which the plasticizer usually represents more than 30% of the mixture. The plastisol mixture is stabilized by conventional materials to maintain the mixture in a stable state during processing. When exposed to heat, the viscosity of the plastisol first decreases and then increases as the resin is advanced to the gelled or cured state.

When starting with a dry mixture, expansion or porogenous agents, which decompose in response to heat, are incorporated in the resin to produce a foamed product.

Polyvinyl chloride sponge or foamed products having connected (open) or disconnected (closed) cells are produced from plastisols by the processes of expansion or foaming the plastisol and heating to gel and to flux the expanded or foamed system. Three techniques have been developed to produce the foamed system. In one method, use is made of a compressed gas, such as a carbon anhydride, carbon dioxide or nitrogen, dissolved under pressure in the plastisol. When the pressure is released, the dissolved gases expand in the plastisol to provide a foamed plastisol having closed cells. In a second method, use is made of chemical blowing or gas generating agents which are decomposed in the plastisol to release a gas, such as nitrogen, to form the plastisol into a foam or sponge. In the third method, use is made of mechanical action to beat the plastisol to form a foam or froth by the incorporation of a multiplicity of air bubbles therein.

The system which makes use of compressed gases requires the use of relatively expensive bottled gases, expensive refrigeration equipment for precise low temperature control, and complicated machinery for operation at high pressure. The process which makes use of chemical blowing agents is expensive by reason of the high cost of the chemical agents and the process is difficult to control. The present system for making use of foaming or frothing by beating air into the plastisol is unsatisfactory from a commercial standpoint, especially with plastisols of low density because the air bubbles tend to collapse before or during heating.

A further process has been proposed wherein use is made of mechanical beating or agitation of the plastisol in the presence of an alkali metal soap and water to form a foam having a fine uniform cellular structure. However, satisfactory results are not consistently obtainable and the use of the required large quantities of emulsifying agent, in the form of a fatty acid soap, is characterized by a sweating out of the soap in a manner to cause the industry to have very little interest in this process.

The process which makes use of dry mixtures is delicate and is limited to use with resins capable of being formed into such dry mixtures.

It is an object of this invention to produce vinyl resin compositions which can be formulated into a plastisol suitable for use in the preparation of foamed products by mechanical action and it is a related object to provide a method for the preparation of foamed products thereof.

In accordance with the practice of this invention, a vinylresin, preferably a polyvinyl chloride resin, is prepared in which a system of surface active or tensio-active agents is provided in an absorbed state on the resinous particles and in which the system of tensio-active agents comprises an alkali metal alkylsulphate emulsifying agent as an essential component; or the combination of an alkali metal alkylsulphate and an alkanolamine alkylsulphate present in the ratio, per 100 parts by weight of vinyl resin, of 1–15 parts by weight of alkali metal alkylsulphate emulsifier and 1–10 parts by weight of alkanolamine alkylsulphate; and preferably a mixture of alkali metal alkylsulphate and alkanolamine alkylsulphate with a condensation reaction product of an alkylene oxide with an alcohol or phenol and/or an alkanolamide present in the ratio, per 100 parts by weight of vinyl resin, of 1–15 parts by weight of alkali metal alkylsulphate emulsifier, 1–10 parts by weight alkanolamine alkylsulphate, 0.5–4 parts by weight of the alkylene oxide-alcohol or phenol condensation product and 0.1–4 parts by weight of the alkanolamide.

As the polyvinyl resin, use can be made of the polymers and copolymers of vinyl chloride, such as polyvinyl chloride, vinyl chloride-vinyl acetate copolymer and the like, or the polymers and copolymers of vinyl acetate, etc.

As the alkali metal alkylsulphate, use can be made of a compound in which the alkali metal is represented by sodium, potassium or ammonium and in which the alkyl group is one having from 10–18 carbon atoms such as decyl, dodecyl, octadecyl and the like.

The component identified as the alkanolamine alkylsulphate refers to a compound in which the alkyl group is of the type previously described for the alkali metal alkylsulphate having from 10–18 carbon atoms and the alkanolamine component comprises at least a $C_2$ to $C_6$ alcohol group and may have from 1–3 amino groups per alcohol, such as ethanolamine, propanolamine, isopropanolamine, butanolamine, iso propanoldiamine and the like.

As the condensation reaction product, use can be made of the condensation reaction product of an alkylene oxide, such as ethylene oxide or propylene oxide, with an alcohol having from 8–18 carbon atoms, such as lauric alcohol, octadecanol, dodecanol, stearyl alcohol and the like, or phenols including alkylphenols and the like having from 2–30 carbon atoms. The compound is formed with polyoxyalkylene chains having from 3–30 alkylene oxide units and preferably 4–16 alkylene oxide units in which the alkylene oxides are of the type having from 2–20 carbon atoms such as ethylene oxide, propylene oxide and the like. The polyoxyalkylene chain can be composed of the same or of different units.

When use is made of an alkanolamide, as in the preferred practice of the invention, the alkanolamide may be selected of the amides formed by the reaction of a fatty acid having from 10–18 carbon atoms, such as lauric acid, stearic acid, oleic acid and the like, with alkanolamines or multialkanolamines having from 2–4 carbon atoms in the alkanol group, such as ethanolamine, diethanolamine and the like.

In accordance with a preferred practice of this invention, the resin is prepared by emulsion polymerization to form a latex. The tensio-active agent or agents are introduced into the emulsion system after which the emulsion is dried, as by spray drying, and the collected resin having the tensio-active agents absorbed on the particles can be further reduced in particle size by crushing.

The following are examples of the practice of this invention, which examples are given by way of illustration and not by way of limitation.

EXAMPLE 1

Part A

To 20 parts by weight of polyvinyl chloride latex prepared by emulsion polymerization, and containing 45% by weight resinous solids, there is introduced:

| | Parts by weight |
|---|---|
| Sodium lauryl sulphate | 0.270 |
| Isopropanolamine lauryl sulphate | 0.225 |
| Ethylene oxide-lauryl alcohol condensation product | 0.180 |
| Alkanolamide formed by reaction of lauric acid with diethanolamine | 0.045 |
| Water | 2.0 |

The materials are mixed with the resinous emulsion and dried as by spray drying. The dried product is crushed for further reduction in particle size by conventional crushing means.

Part B

A plastisol is formed of the following materials:

| | Parts by weight |
|---|---|
| Dried resin of part A | 100 |
| Dioctyl phthalate | 40 |
| Butyl benzyl phthalate | 40 |
| Epoxidized soyabean oil (stabilizer) | 5 |

The ingredients are mixed in a Werner type blender for for 20 minutes and kneading is continued for an additional 20 minutes under vacuum.

The plastisol is whipped, as by means of a Dan mixer, or other conventional whipping or beating apparatus, to form the materials into a foam.

The foam is spread on a paper strip treated with silicone and advanced through a tunnel furnace maintained at a temperature of 160° C. to effect gellification or cure. In the illustrated modification, the tunnel is 6 meters long and the strip is advanced at a speed of 1 meter per minute thereby to expose the resinous system to the temperature of the furnace for about 6 minutes.

The prepared vinyl resinous foam has an apparent volumetric mass of .35 g./cm.$^3$ and is characterized by an open cellular structure to produce a uniform-fine foam having a mat surface, regular appearance and soft hand.

EXAMPLES 2 AND 3

Part A

Part A is prepared in accordance with that of Example 1 except that the aqueous solutions of surface active agent admixed with the polyvinyl chloride latex is formulated of the following.

Example 2:

| | Parts by weight |
|---|---|
| Ammonium lauryl sulphate | 3.22 |
| Isopropanoldiamine lauryl sulphate | 2.50 |
| Water | 2.0 |

Example 3:

| | |
|---|---|
| Potassium dodecyl sulphate | 2.95 |
| Butanolamine lauryl sulphate | 2.45 |
| Propylene oxide-lauryl alcohol condensation product | 1.80 |
| Water | 2.0 |

The procedure following in Examples 2 and 3 is the same as that of Example 1.

It will be apparent from the foregoing that the concept of this invention provides a foamed vinyl resin that is easy to prepare, which has fine regular cells and very low apparent volumetric mass and in which the materials of which it is formed can be easily emulsified to give a firm and stable dispersion.

The improved characteristics and quality of the vinyl resinous foams prepared in accordance with the practice of this invention enable use not only in normal applications but in applications not heretofore available to such foams.

It will be understood that changes may be made in the details of formulation, method and operation without departing from the spirit of the invention, especially as defined in the following claims.

I claim:

1. The process for producing a foamed vinyl resinous product comprising the steps of adding plasticizers to the vinyl resinous composition to form a plastisol thereof wherein the vinyl resin composition consists essentially of finely divided vinyl resinous particles of a polymer selected from the group consisting of polyvinyl chloride, vinyl chloride-vinyl acetate copolymers and polyvinyl acetate, and a tensio-active system consisting essentially of 1–15 parts by weight of an alkyl sulfate salt of a cation selected from the group consisting of alkali metal cations and ammonium cations in which the alkyl group contains 10–18 carbon atoms, and 1–10 parts by weight of an alkanolaminealkyl sulfate in which the alkyl group contains 10–18 carbon atoms per 100 parts by weight of vinyl resin, said tensio-active system being present in an absorbed state on the resinous particles, and said composition having been prepared by admixing the tensio-active system with a latex of the vinyl resinous material and then drying the resulting mixture, foaming the plastisol by physically whipping the plastisol and then heating the plastisol to set the foamed product.

2. The process for producing a foamed vinyl resinous product comprising the steps of adding plasticizers to the vinyl resinous composition to form a plastisol thereof wherein the vinyl resin composition consists essentially of finely divided vinyl resinous particles of a polymer selected from the group consisting of polyvinyl chloride, vinyl chloride-vinyl acetate copolymers and polyvinyl acetate, and a tensio-active system consisting essentially of 1–15 parts by weight of an alkyl sulfate salt of a cation selected from the group consisting of alkali metal cations and ammonium cations in which the alkyl group contains 10–18 carbon atoms, 1–10 parts by weight of an alkanolaminealkyl sulfate in which the alkyl group contains 10–18 carbon atoms, and at least one compound selected from the group consisting of 0.5–4.0 parts by weight of the condensate formed of an alkylene oxide with an alcohol or phenol, and 0.1–4.0 parts by weight of an alkanolamide per 100 parts by weight of the vinyl resin, said tensio-active system being present in an absorbed state on the resinous particles and said composition having been prepared by admixing the tensio-active system with a latex of a vinyl resinous material and then drying the resulting mixture, foaming the plastisol by physically whipping the plastisol and then heating the plastisol to set the foamed product.

3. The process as claimed in claim 1 in which the alkanol group of the alkanolamine alkylsulfate is a $C_2$ to $C_6$ alkanol.

4. The process as claimed in claim 1 in which the materials are present in the ratio of 1 to 15 parts by weight of the alkali metal alkyl-sulfate and 1 to 10 parts by weight of the alkanolamine alkylsulfate per 100 parts by weight of the vinyl resin.

5. The process as claimed in claim 2 in which the alkyl sulfate is selected from the group consisting of sodium, potassium and ammonium alkyl sulfates.

6. The process as claimed in claim 2 in which the alkanol group of the alkanol-amine alkyl sulfate has from 2 to 6 carbon atoms.

7. The process as claimed in claim 2 in which the alkylene oxide-alcohol or phenol condensation product is formed of an alkylene oxide having from 2 to 20 carbon atoms.

8. The process as claimed in claim 2 in which the alkylene oxide-alcohol or phenol condensation product is formed of an alkylene oxide selected from the group consisting of ethylene oxide or propylene oxide and an alcohol selected from the group consitsing of 8 to 18 carbon atoms and a phenol or substituted phenol having from 2 to 20 carbon atoms in the alkyl group.

9. The process as claimed in claim 7 in which the alkylene oxide-alcohol or phenol condensation product has from 3 to 30 alkylene oxide units.

10. The process as claimed in claim 2 in which the alkanolamide comprises the reaction product of a fatty acid having from 10 to 18 carbon atoms with an alkanolamide having from 2 to 4 carbon atoms.

References Cited
UNITED STATES PATENTS

| | | | |
|---|---|---|---|
| 2,861,963 | 11/1958 | Butsch | 260—2.5 |
| 3,202,307 | 8/1965 | Rainer et al. | 260—2.5 |
| 3,016,576 | 1/1962 | Downing et al. | 260—2.5 |

JOHN C. BLEUTGE, Primary Examiner

U.S. Cl. X.R.

260—23 EP, 23 XA, 29.6 MQ, 31.8 R